United States Patent

Ogawa

[11] Patent Number: 5,991,644
[45] Date of Patent: Nov. 23, 1999

[54] FOLDING PORTABLE COMMUNICATIONS DEVICE

[75] Inventor: Yutaka Ogawa, Tokyo, Japan

[73] Assignee: NEC Corporation, Tokyo, Japan

[21] Appl. No.: 08/563,944

[22] Filed: Nov. 29, 1995

[30] Foreign Application Priority Data

Nov. 30, 1994 [JP] Japan .................................. 6-319407

[51] Int. Cl.⁶ ........................................................ H04Q 7/20
[52] U.S. Cl. .......................................... 455/566; 455/575
[58] Field of Search ....................... 379/58, 433; 455/89, 455/351, 556, 566, 575; D14/138

[56] References Cited

U.S. PATENT DOCUMENTS

| D. 315,347 | 3/1991 | Walker ................................. D14/138 |
| 5,173,939 | 12/1992 | Ditzig et al. ............................ 379/433 |
| 5,189,632 | 2/1993 | Paajanen et al. ....................... 455/556 |
| 5,276,916 | 1/1994 | Pawlish et al. ......................... 455/575 |
| 5,327,584 | 7/1994 | Adachi et al. .......................... 455/575 |
| 5,436,954 | 7/1995 | Nishiyama et al. .................... 455/566 |
| 5,463,687 | 10/1995 | Takizawa ............................... 379/433 |
| 5,491,507 | 2/1996 | Umezawa et al. ..................... 455/566 |
| 5,655,018 | 8/1997 | Estevez-Alcolado De Holl et al. . 379/433 |

FOREIGN PATENT DOCUMENTS

| 0 588 210 | 3/1994 | European Pat. Off. . |
| 3323-858 | 1/1985 | Germany ..................... 379/FOR 106 |
| 5-211464 | 8/1993 | Japan . |
| 5-260143 | 10/1993 | Japan . |
| 6-34347 | 5/1994 | Japan . |
| WO 94/13088 | 6/1994 | WIPO . |

OTHER PUBLICATIONS

JAPIO Abstract Accession No. 04671194 & JP 06–343094 A, Dec. 13, 1994.

*Primary Examiner*—Dwayne D. Bost
*Assistant Examiner*—Myron K. Wyche
*Attorney, Agent, or Firm*—Scully, Scott Murphy & Presser

[57] ABSTRACT

A folding portable communications device which has a first housing 1 to which a second housing 2 and a third housing 4 are connected in a foldable manner, with a display section 11, a receiver section 13 and a keyboard section 14 provided in the housings, respectively. The second housing 2 and the third housing 4 are folded on the first housing 1 when not in use. When the third housing 4 is unfolded for use as a telephone, information of higher precedence is displayed on part of the display section 11. When the second housing 2 and the third housing 4 are unfolded for use as a data transmitter/receiver, the entire display section 11 extending almost over the inner surface of the first housing 1 is used. Selection of functions as telephone or data transmitter/receiver may be easily carried out with a select switch 16.

15 Claims, 10 Drawing Sheets

FOLDING PORTABLE COMMUNICATIONS DEVICE

BACKGROUND OF THE INVENTION

1. Field of the Invention

The present invention relates to a portable communications device, and more particularly to a folding portable communications device with a data display section.

2. Description of the Prior Art

Conventionally known portable communications devices such as portable telephones are each constructed with a slim housing with an antenna on its upper surface, near an edge thereof; and a receiver section, a display section, a keyboard section and a transmitter section placed on the front of the housing in that order from the top to the bottom. The display section and the keyboard section make up almost the entire front of the housing of this type of portable telephone. Therefore, increase in the area occupied by either the display section or the keyboard section produces the problem of reduced area occupied by the other.

For instance, the recent trend of portable telephones has been toward models each constructed so as to display the status of the portable telephone and the data received by it in addition to the destined telephone number, the remaining capacity of the battery, etc. on the display section. These portable telephones are each desired to have the greatest possible area for the display section. With portable telephones constructed as mentioned above, however, it is natural that increase in the area of the display section results in the smaller and thus hard-to-use keyboard section.

As a solution to such problems, Japanese Utility Model Law Application Disclosure HEI 6-34347, for instance, suggests a configuration where a receiver is placed over the underside of a display section, with a through-hole formed from the receiver section to the surface of the display section. This configuration, however, makes it difficult to construct a planar display section, and the increased thickness of the overlapped structural portions becomes an obstacle to construction of low-profile portable telephones.

As another solution, Japanese Unexamined Patent Application Disclosure HEI 5-211464 and Japanese Unexamined Patent Application Disclosure HEI 5-260143 each suggest a folding structure where a foldable housing is attached to the main body of a portable telephone, and a keyboard section is provided on the housing section. In addition, according to these conventional structures, a receiver section and a display section are usually provided on the main body, while a transmitter section and a keyboard section are provided on the foldable section. These configurations allow the display section to extend to the same area as the keyboard section. Since the receiver section contains a speaker, however, it is difficult to increase the area of the display section by further reducing the size of the receiver section.

SUMMARY OF THE INVENTION

It is an object of the present invention to provide a portable communications device with a small outside dimension and a large-area display section.

In order to accomplish the above object, the portable communications device according to the present invention has a basic structure equipped with first, second and third housings. In addition, a display section is provided on the side of the first housing. The second housing has a receiver section and is connected to the top of the first housing in a foldable manner. The third housing has a keyboard and is connected to the bottom of the first housing in a foldable manner.

The portable communications device according to the present invention is designed so as to allow the entire side of the first housing to be used as the display section with a largest possible area by unfolding the second and the third housings which are folded on each other when not in use.

BRIEF DESCRIPTION OF THE DRAWINGS

The above and other objects, features and advantages of the present invention will become apparent from the following detailed description when taken together with the accompanying drawings in which.

DETAILED DESCRIPTION OF THE PREFERRED EMBODIMENTS

Figure 1:
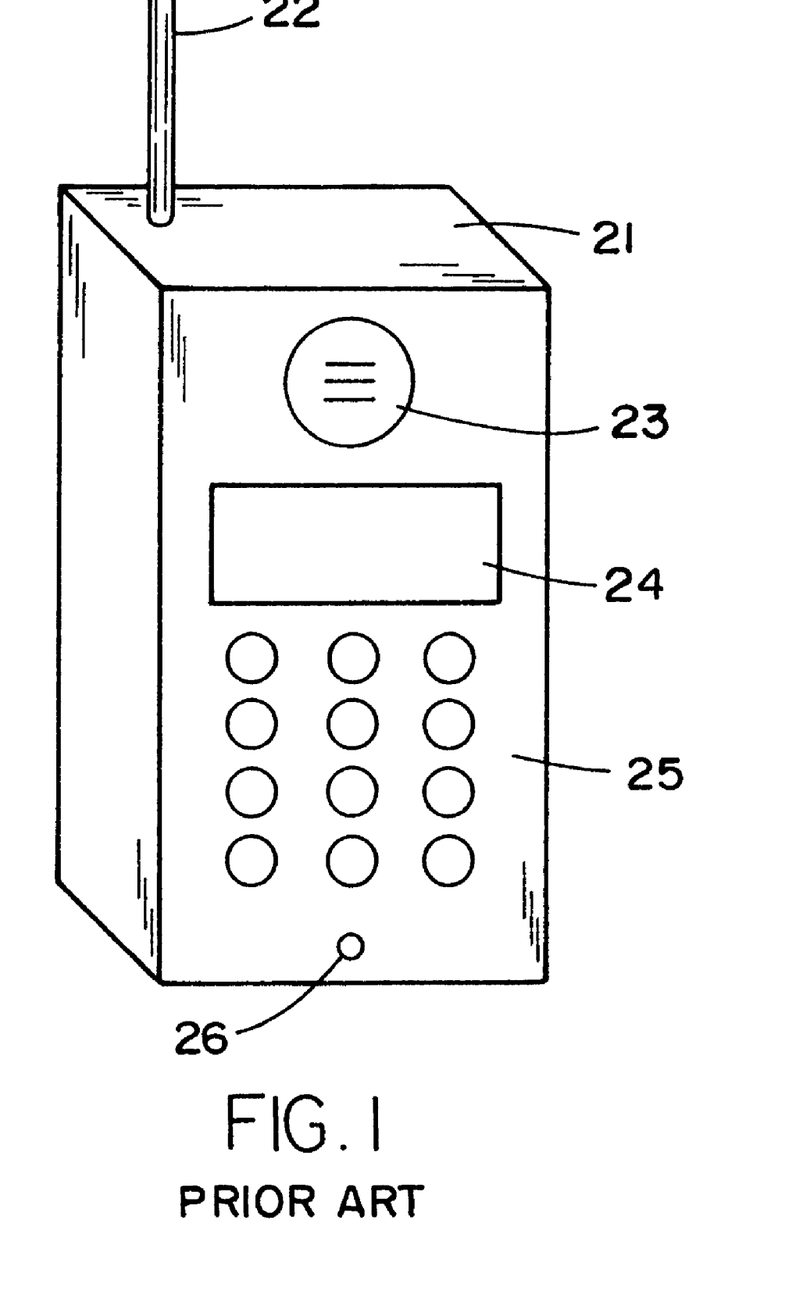
FIG. 1 is a perspective view illustrative of a portable telephone of the prior art.

First, a portable telephone of the prior art will be explained with reference to FIG. 1.

An antenna 22 is attached to the top surface of a slim housing 21, near an edge thereof, and the side of the same housing 21 is provided with a receiver section 23, a display section 24, a keyboard section 25 and a transmitter section 26 arranged in that order from the top to the bottom. With the portable telephone constructed in this way, the display section 24 cannot have a large area, and thus only a slight amount of data may be displayed on the display section 24.

An embodiment according to the present invention will now be explained with reference to the accompanying drawings.

Figure 2A:
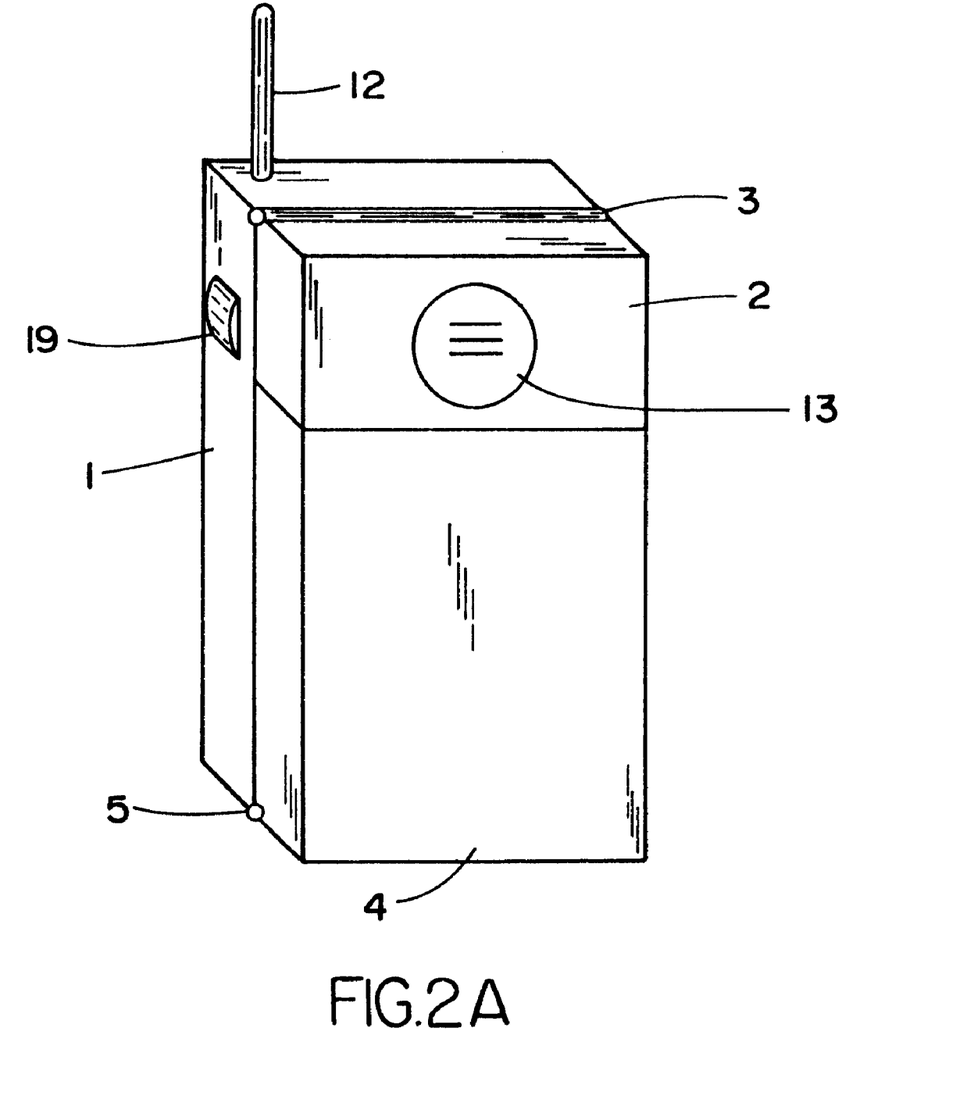
FIG. 2A and FIG. 2B are perspective views illustrative of an embodiment according to the present invention where second and third housings are folded on each other.

FIG. 2A is a perspective view illustrative of a portable communications device in a state where a second housing 2 and a third housing 4 are folded on a first housing 1. The portable communications device has almost the same length as the first housing 1 while the second housing 2 and the third housing 4 are folded.

Figure 2B:
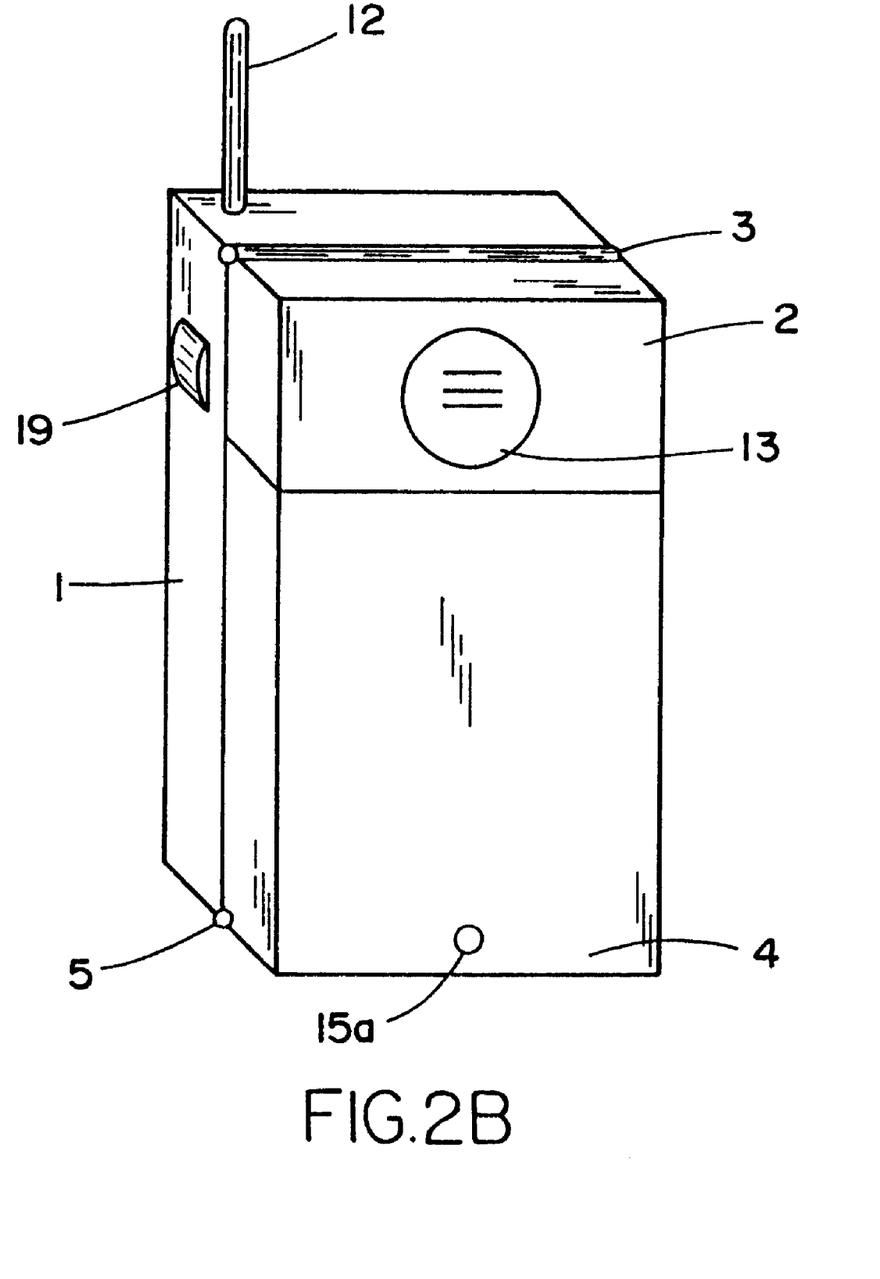

An antenna 12 is provided on the top surface of the first housing 1, near an edge thereof, and a switch 19 is provided on the side of the first housing 1. The second housing 2 of the same width as the first housing 1 is attached to the top of the first housing 1 with a hinge mechanism 3 in a foldable manner. A receiver section 13 is provided on the outer surface of the second housing 2. This receiver section 13 may be provided on the inner surface of the second housing 2 instead. Also, the third housing 4 of the same width as the first housing 1 is attached to the bottom of the first housing 1 with a hinge mechanism 5 in a foldable manner. In addition, as shown in FIG. 2B, a transmitter section 15a may be formed on the outer surface of the third housing 4, near the bottom thereof. This transmitter section 15a may be provided in addition to a transmitter section 15b as shown in FIG. 3A and a transmitter section 15c as shown in FIG. 3B which will be explained below.

Figure 3A:
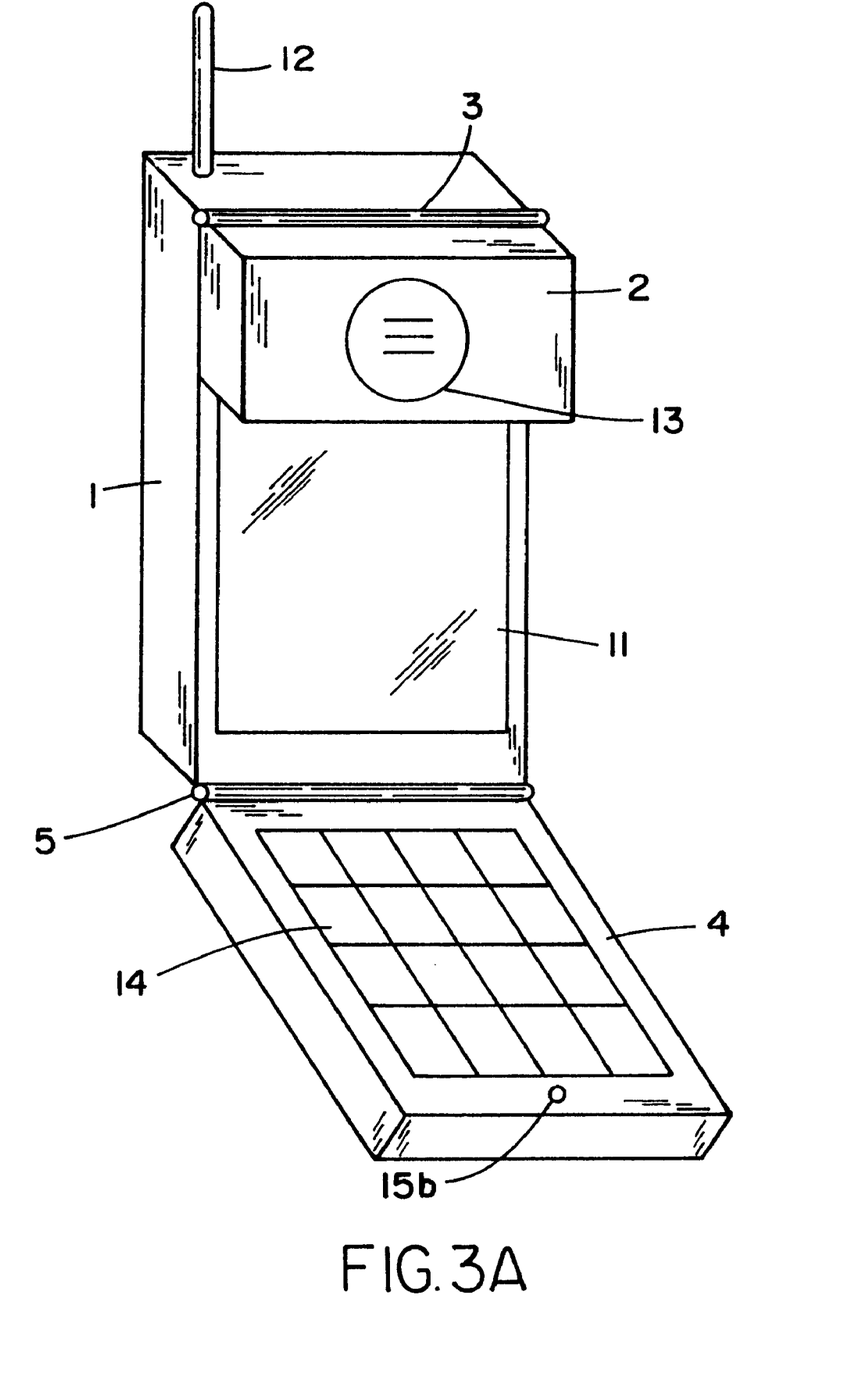
FIG. 3A and FIG. 3B are perspective views illustrative of the embodiment according to the present invention where only a third housing is unfolded.
Figure 3B:
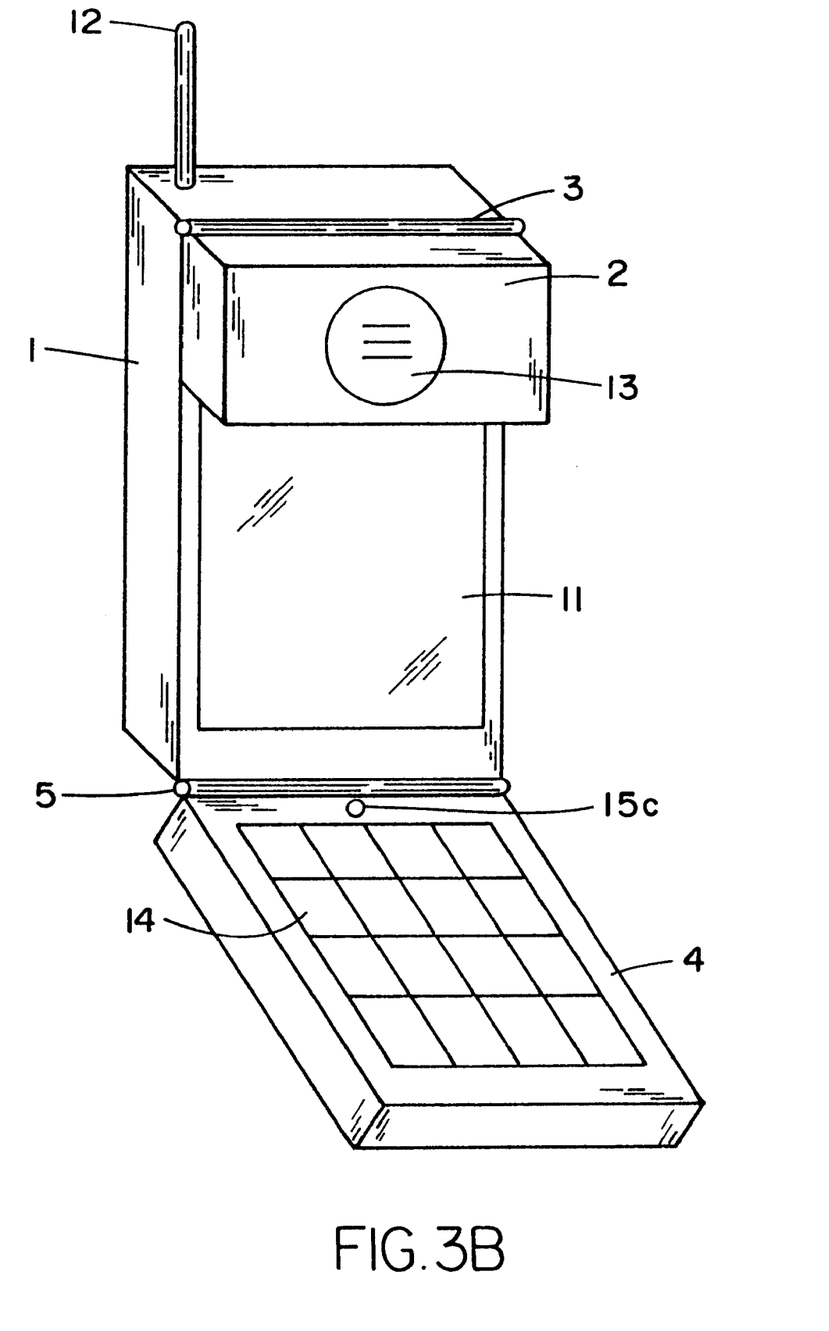

FIG. 3A is a perspective view illustrative of the third housing 4 in an unfolded state. A keyboard section 14 and a transmitter section 15b are provided on the inner surface of the third housing 4. As shown in FIG. 3B, the transmitter section 15c may also be provided on the inner surface of the third housing 4, near the hinge section 5. The transmitter section 15a shown in FIG. 2B may be provided in addition to these transmitter sections. A display section 11 is provided on the inner surface of the first housing 1. The third housing 4 may be unfolded to any angle of up to approximately 180° C. The present embodiment is constructed so that the third housing 4 may be temporarily held at angles of approximately 150° and approximately 180° from the folded state during the process of unfolding.

Figure 4A:
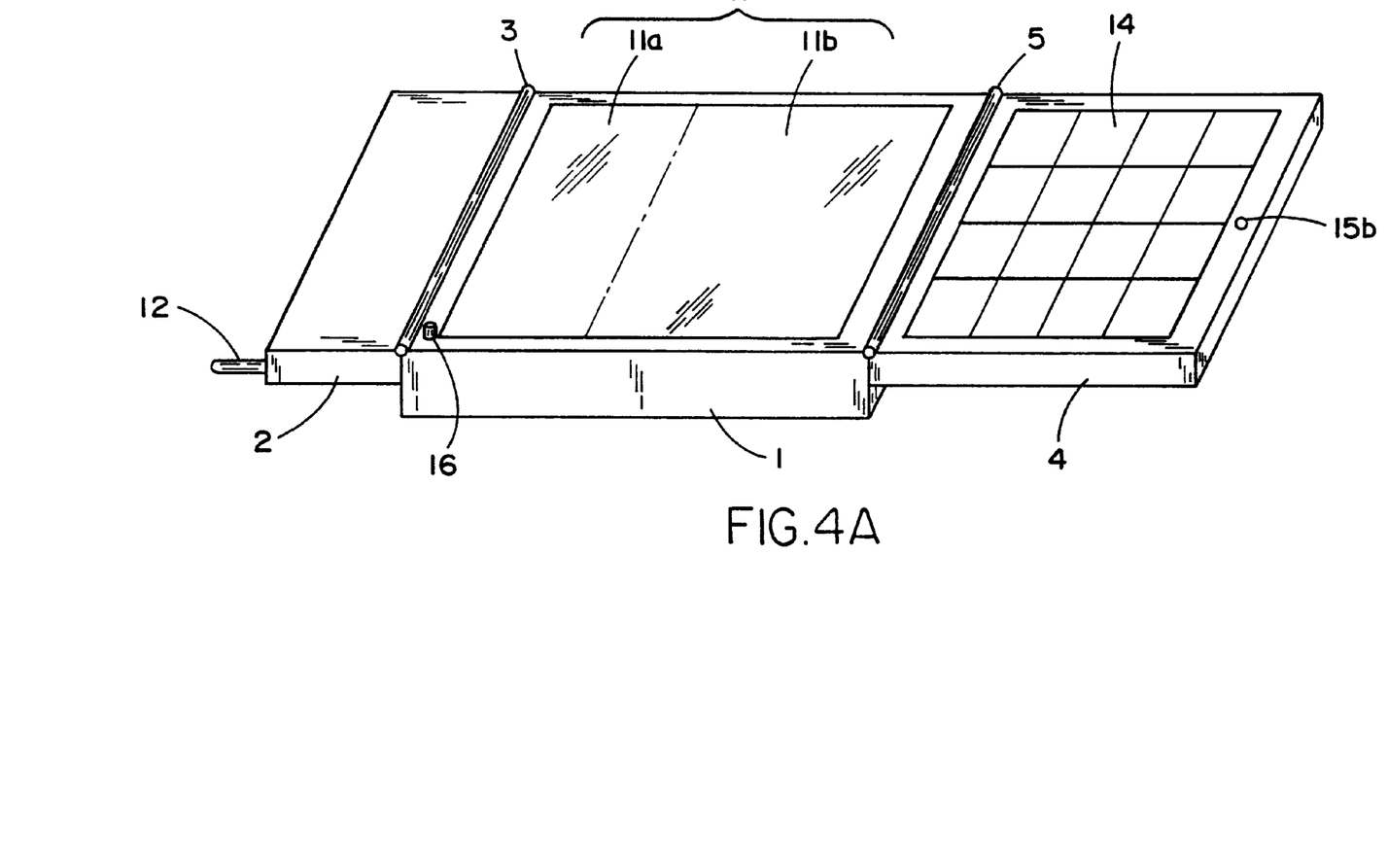
FIG. 4A, FIG. 4B and FIG. 4C are perspective views illustrative of the embodiment according to the present invention where second and third housings are unfolded.
Figure 4B:
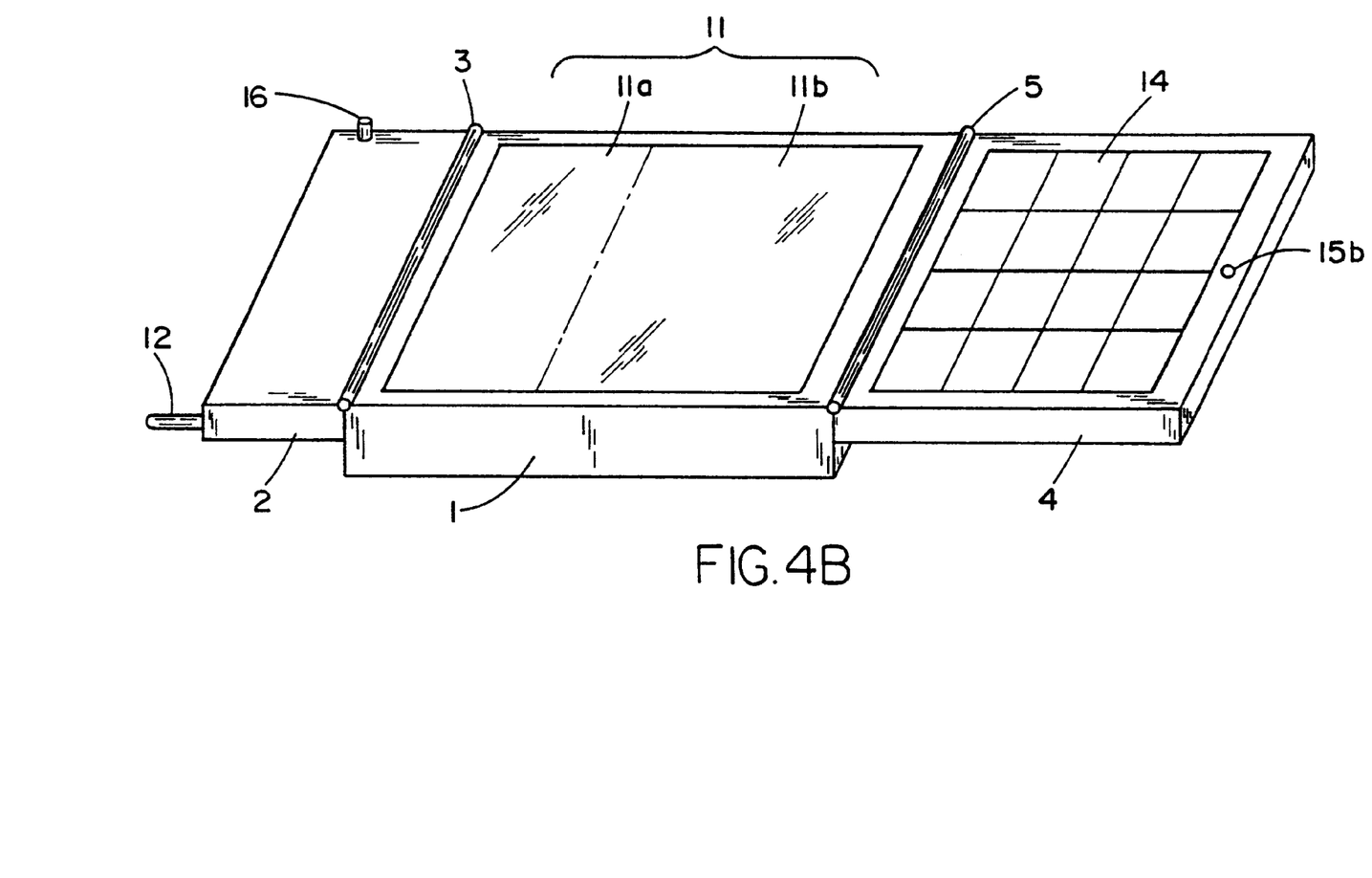
Figure 4C:
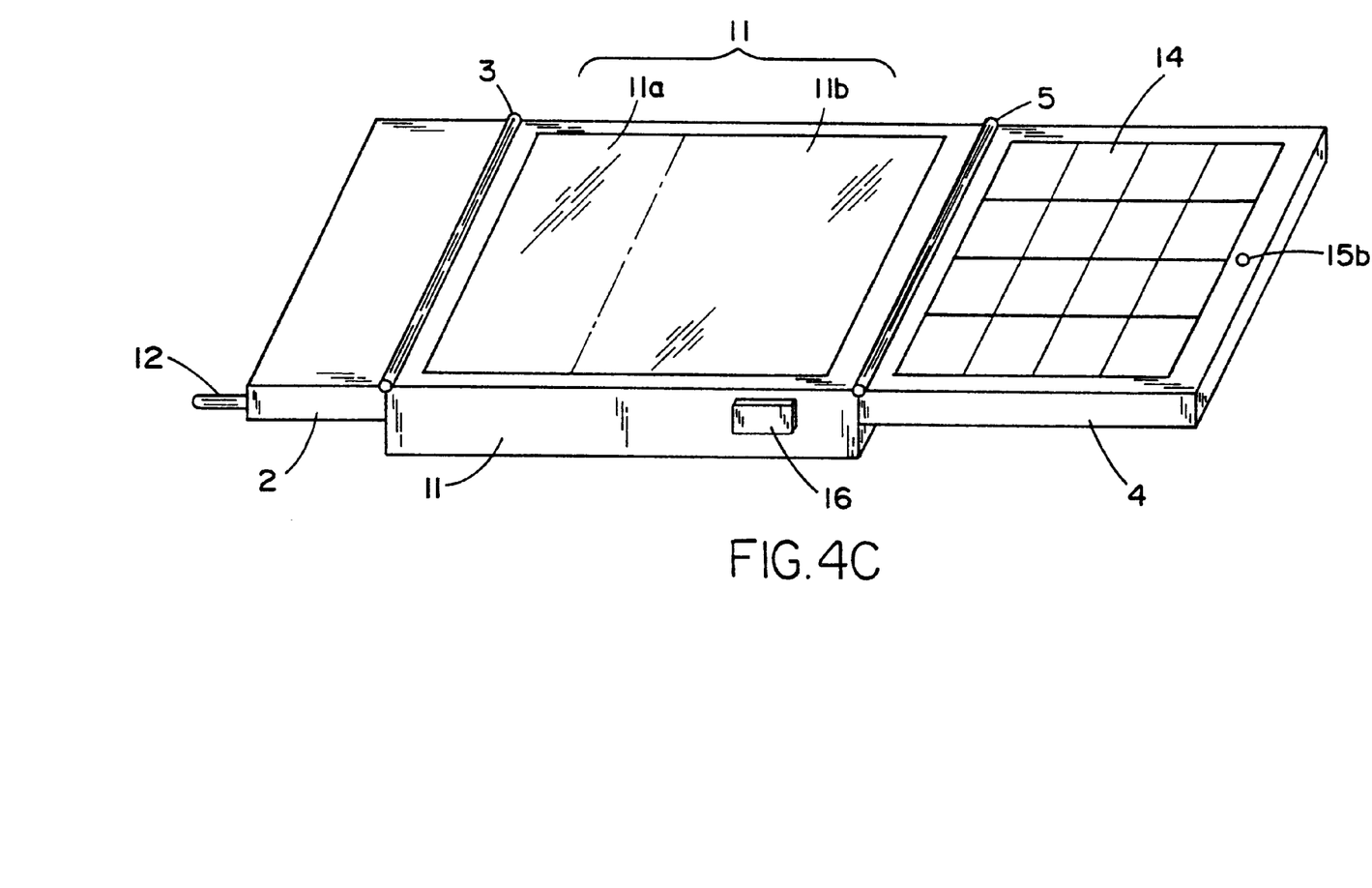

FIG. 4A shows the states of the second housing 2 and the third housing 4 unfolded to angles of approximately 180°, respectively, with respect to their states folded on the first housing 1. The display section 11 occupies almost the entire inner surface of the first housing 1. Further, a push-button select switch 16 is provided on a region of the inner surface of the first housing 1 which is brought into contact with the second housing 2 when folded. With the second housing 2 folded, the select switch 16 is pressed by the second housing 2 thereby activating the portable communications device as a telephone. On the other hand, when the second housing 2 is unfolded as shown in FIG. 4A, the select switch 16 functions to activate the portable communications device as a data transmitter/receiver. This select switch 16 may be provided on the inner surface of the second housing 2 instead, as shown in FIG. 4B. In addition, the select switch 16 may also be provided on another place as that of the keyboard section 14 instead, as shown in FIG. 4C.

As shown in FIG. 4A, the display section 11 is demarcated into a region 11a which is covered with the folded second housing 2 and another region 11b. When the portable communications device works as a data transmitter/receiver, the entire surface of the display section 11 is used for display of data. On the other hand, when the portable communications device works as a telephone, the region 11a and the region 11b of the display section 11 are separately controlled for display of data.

Figure 5:
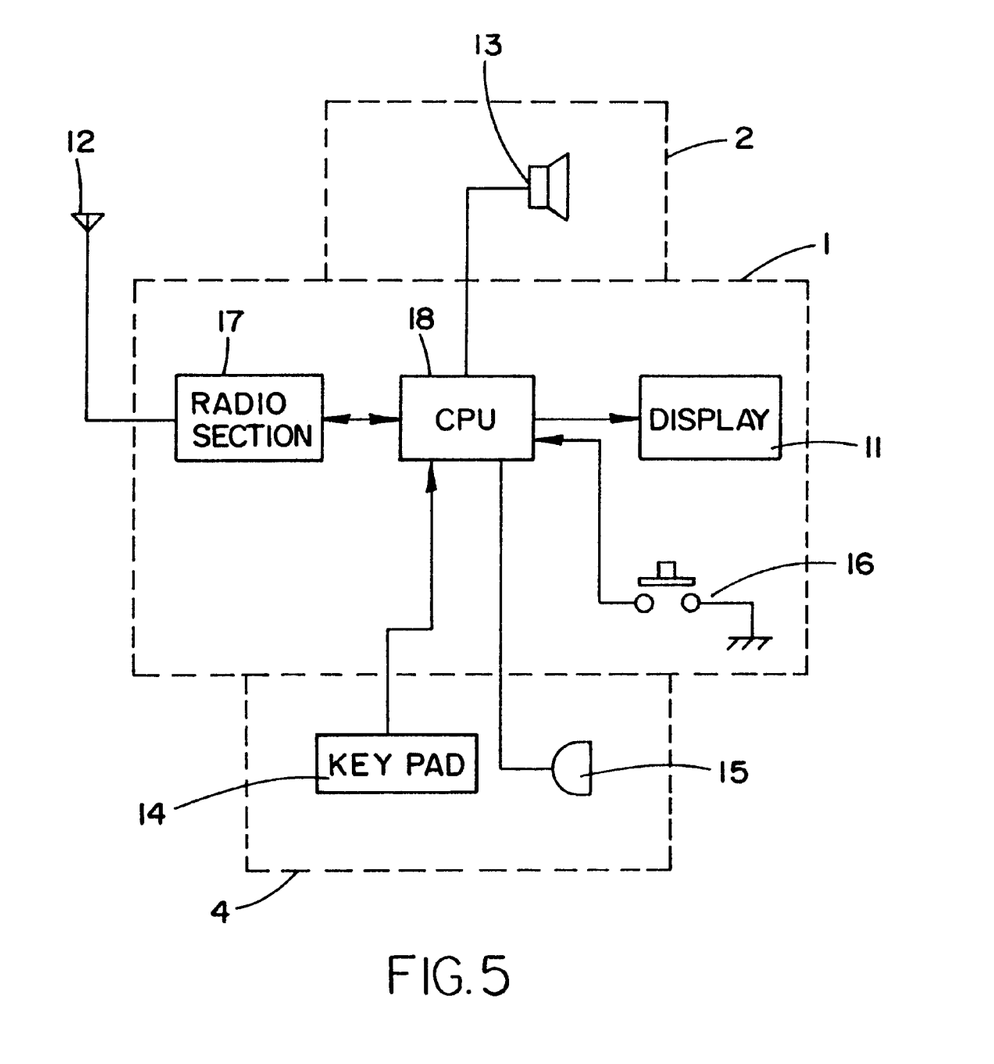
FIG. 5 is an internal view illustrative of the embodiment of the present invention.

FIG. 5 is a block diagram of the portable communications device of the present embodiment. The first housing 1 is equipped with a radio section 17 which transmits and receives signals via the antenna 12, a control section 18 which controls the device in response to data transmitted and received by the radio section 17, a display section 11 constructed with LCDs and a select switch 16. The second housing 2 contains a speaker which is part of a receiver section 13. The third housing 4 is provided with a keyboard section 14 which inputs signals to the control section 18 and a microphone which is part of a transmitter section 15. The receiver section 13 in the second housing 2 and the keyboard section 14 and the transmitter section 15 in the third housing 4 are electrically connected to respective associated portions in the first housing 1 via flexible printed wiring boards built in the hinge mechanisms 3, 5.

When the portable communications device according to the present invention is not in use, the second housing 2 and the third housing 4 are folded on the first housing 1 around the hinge mechanisms 3, 5, as shown in FIG. 2A. As a result, the entire configuration of the portable communications device becomes almost the same as that of the first housing 1, and this contributes to improved portability-of the portable communications device. In addition, the surface of the display section 11 is protected by the second and the third housings 2, 4.

In cases where the portable communications device of the present embodiment is used as a telephone, voice may be received by turning on the switch 19 after a call signal is received even while the second housing 2 and the third housing 4 remain folded. In addition, as shown in FIG. 3A, unfolding of only the third housing 4 to an angle of approximately 150° from the first housing 1 allows transmission and reception of voice. In cases where the receiver section 13 is additionally provided on the inner surface of the second housing 2, a conversation may be carried out by unfolding both the second housing 2 and the third housing 4.

In cases where the third housing 4 is unfolded for use, the control-section 18 functions so that information is displayed on the region 11b of the display section 11 which the user can view, and no information is displayed or information of lower precedence is displayed on the region 11a of the display section 11 which is covered with the second housing 2. The information to be displayed on the display section 11 and the order of precedence are determined in advance. The information to be displayed on the region 11a and the region 11b, respectively, are also determined in advance. The information to be displayed on the region 11a includes, for example, information on the current state of the radiotelephone line, data transmitted from the communications device at the other end, etc. On the other hand, the information to be displayed on the region 11a is information on settings of the functions, the voltage of the battery, etc., for example. With control performed in this way, the user can enjoy a telephone conversation while confirming information of higher precedence or importance displayed on the region 11b. It is also possible to carry out a control process which displays all the information in order of precedence on the region 11b successively from the bottom to the top without separating the region 11a and the region 11b of the display section 11.

Here, in cases where the user wants to gain information on the telephone such as settings of the functions and the voltage of the battery when the telephone is not in service, the information may be displayed on the display section 11a by unfolding either the second housing 2 or both the second housing 2 and the third housing 4 and operating with the select switch 16.

In cases where the portable communications device according to the present embodiment is used as a data transmitter/receiver, the second housing 2 and the third housing 4 are unfolded to approximately 180° from the first housing 1 to arrange all the housings almost in the same plane. Since the second housing is unfolded, the select switch 16 is brought into a unpressed state, and thus the control section 18 controls the portable communications device to work as a data transmitter/receiver. The control section 18, which has a storage section which stores received information and information inputted with the keyboard section 14, displays the information on the entire surface of the display section 11 and concurrently controls the transmission and reception of the information. In addition, since the third housing 4 is unfolded almost in the same plane as that of the first housing 1, it is easy to operate with keys. In cases where the select switch 16 is provided on another place such as that of the keyboard section 14 as shown in FIG. 4C, the control section 18 controls the display on the display section 11 so that the portable communications device works as a data transmitter/receiver even while the second housing 2 remains folded.

Figure 6A:
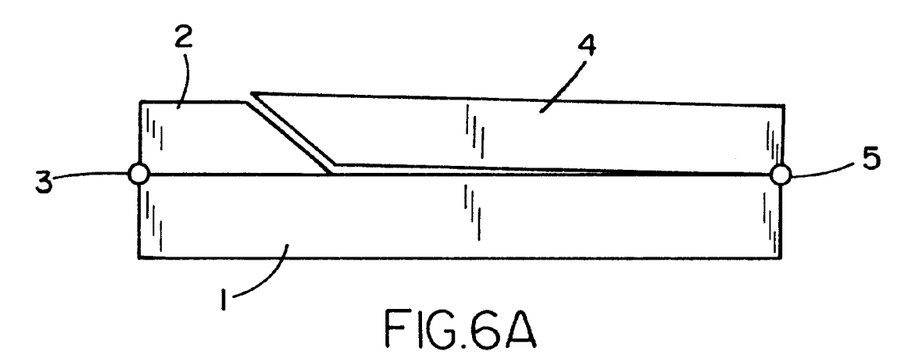
FIG. 6A and FIG. 6B are side views illustrative of another embodiment of the present invention.
Figure 6B:
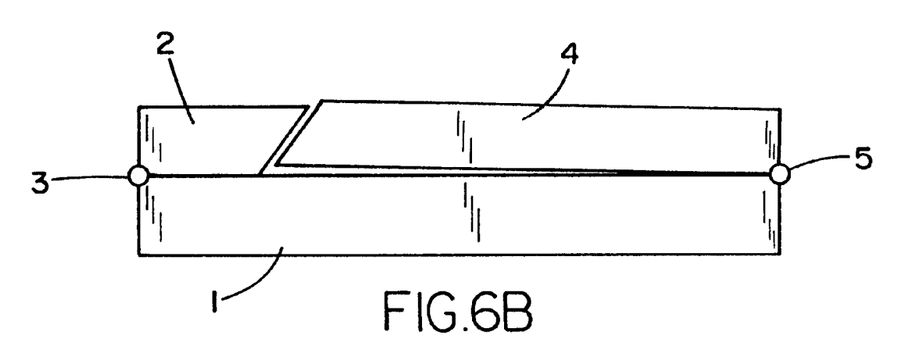

Further, as shown in FIG. 6A and FIG. 6B, the second housing 2 and the third housing 4 may be constructed with facing slants. This configuration results in an expanded section of the third housing 4 on which the keyboard section 14 may be placed.

As described above, since the portable communications device of the present invention is constructed with such a configuration that the second housing 2 and the third housing 4 are connected to the first housing 1 in a foldable manner, and the display section 11, the receiver section 13 and the keyboard section 14 are placed in these housings, respectively, the entire configuration is made compact, and further the display section 11 may be formed almost over the entire side of the first housing 1, with a larger area of the display section 11 than according to the prior art.

In addition, since the portable communications device of the present invention allows unfolding of the second housing 2 and the third housing 4 to approximately 180° with respect to the first housing 1, it is possible to use the large-area display section, and this makes its use as a data transmitter/receiver easier.

Furthermore, since the select switch 16 is provided on either the first housing 1 or the second housing 2, it is easy to switch between the functions of telephone and data transmitter/receiver.

While the present invention has been described in connection with certain preferred embodiments, it is to be understood that the subject matter encompassed by the present invention is not limited to those specific embodiments. On the contrary, it is intended to include all alternatives, modifications, and equivalents as can be included within the spirit and scope of the following claims.

What is claimed is:

1. A folding portable communications device for use as a telephone and/or a data transmitter/receiver, comprising:
   a first housing having a top, a bottom, and an inner side surface, and a display section disposed on the inner surface for displaying received data;
   a second housing connected to the top of said first housing in a foldable manner to define a folded state and an unfolded state, said second housing having inner and outer surfaces, said inner surface of said second housing facing and being positioned adjacent to said inner surface of said first housing and overlapping a first portion of the display section when the second housing is in its folded state, said second housing further having a receiver section disposed on its outer surface which faces away from said first housing when the second housing is in its folded state, to enable usage of the device as a telephone when the second housing is in its folded state; and
   a third housing connected to the bottom of said first housing in a foldable manner to define a folded state and an unfolded state, said third housing having inner and outer surfaces, said inner surface of said third housing having a keyboard disposed thereon which faces and is positioned adjacent to the inner surface of said first housing and overlaps a second portion of the display section when the third housing is in its folded state, said third housing further having a transmitter disposed thereon;
   wherein the communications device operates as a telephone when the second housing is in its folded state, and operates as a data transmitter/receiver when the second and third housings are in their unfolded states.

2. A folding portable communications device as claimed in claim 1, wherein the transmitter is disposed on the outer surface of the third housing which faces away from said first housing in the folded state of the third housing, to enable usage of the device as a telephone in the folded state of the third housing.

3. A folding portable communications device as claimed in claim 1, wherein the transmitter is disposed on the inner surface of the third housing which faces away from said first housing in the folded state of the third housing, to enable usage of the device as a telephone in the folded state of the third housing.

4. A folding portable communications device as claimed in claim 1, wherein a transmitter is provided on both the inner surface and the outer surface of the third housing, such that the device can be used as a telephone when the third housing is in its folded state or when the third housing is in its unfolded state.

5. A folding portable communications device as claimed in claim 1, wherein the display section is provided over a major portion of the inner surface of the first housing.

6. A folding portable communications device as claimed in claim 1, wherein the display section is provided over substantially the entire inner surface of the first housing.

7. A folding portable communications device as claimed in claim 1, wherein the second housing and the third housing have slanted end surfaces which are positioned parallel to each other when the second housing and the third housing are in their folded states, wherein the slanted end surface of the third housing increases the surface area of the third housing on which the keyboard is disposed.

8. A folding portable communications device as claimed in claim 1, further including switching means for switching between the functions of a telephone and a data transmitter/receiver.

9. A folding portable communications device as claimed in claim 8, wherein the switching means detects whether the second housing is in its folded state or not, and the device selects the function of a telephone or a data transmitter/receiver respectively in response to a signal from the switching means indicating that the second housing is respectively in its folded state or its unfolded state.

10. A folding portable communications device as claimed in claim 8, wherein the switching means is provided on the region of the inner surface of the first housing adjacent to which the second housing is positioned in its folded state, or on the inner surface of the second housing.

11. A folding portable communications device as claimed in claim 1, which displays information on the display section in separate modes, depending upon its usage as a telephone or as a data transmitter/receiver.

12. A folding portable communications device as claimed in claim 1, which, when used as a telephone, displays information of higher precedence on the region of the display section which is not covered by the second housing, and displays information of lower precedence or no information on the region of the display section which is covered by the second housing.

13. A folding portable communications device as claimed in claim 1, which, when used as a telephone, displays information of higher precedence on the display section successively, starting at the side of the bottom of the first housing.

14. A folding portable communications device as claimed in claim 1, wherein the entire display section is used as a region for displaying information during transmission or reception of data.

15. A folding portable communications device as claimed in claim 1, wherein the display section is demarcated into a first region which is covered by the second housing in its folded state and a second region, and when the portable communications device is used as a telephone, the first region and the second region of the display section are separately controlled for display of data.

* * * * *

UNITED STATES PATENT AND TRADEMARK OFFICE
CERTIFICATE OF CORRECTION

PATENT NO. : 5,991,644
DATED : November 23, 1999
INVENTOR(S) : Yutaka Ogawa

It is certified that error appears in the above-identified patent and that said Letters Patent is hereby corrected as shown below:

On The Title Page, [56] References Cited, U.S. PATENT DOCUMENTS:

"5,173,939" should read --5,173,936--

Signed and Sealed this

Seventh Day of November, 2000

Attest:

Attesting Officer

Q. TODD DICKINSON
Director of Patents and Trademarks